US010257368B2

(12) United States Patent
Nerst et al.

(10) Patent No.: US 10,257,368 B2
(45) Date of Patent: Apr. 9, 2019

(54) SYSTEM AND METHOD FOR COMMUNICATION BETWEEN MOBILE DEVICES

(71) Applicant: GENBAND US LLC, Frisco, TX (US)

(72) Inventors: Alex Nerst, Ashdod (IL); Avi Shechter, Ramat Hasharon (IL); Boaz Zilberman, Ramat Hasharon (IL)

(73) Assignee: GENBAND US LLC, Frisco, TX (US)

( * ) Notice: Subject to any disclaimer, the term of this patent is extended or adjusted under 35 U.S.C. 154(b) by 1025 days.

(21) Appl. No.: 14/599,283

(22) Filed: Jan. 16, 2015

(65) Prior Publication Data

US 2015/0201090 A1 Jul. 16, 2015

Related U.S. Application Data

(63) Continuation of application No. 12/517,559, filed as application No. PCT/IL2007/001501 on Dec. 5, 2007, now abandoned.

(60) Provisional application No. 60/868,637, filed on Dec. 5, 2006.

(51) Int. Cl.
*G06Q 30/00* (2012.01)
*H04M 15/00* (2006.01)
*G06Q 30/06* (2012.01)
*H04L 29/08* (2006.01)

(52) U.S. Cl.
CPC ........ *H04M 15/7652* (2013.01); *G06Q 30/06* (2013.01); *G06Q 30/0601* (2013.01); *H04L 67/104* (2013.01); *H04M 15/723* (2013.01); *H04M 15/886* (2013.01)

(58) Field of Classification Search
CPC .. H04M 15/00; H04M 15/723; H04M 15/886; H04M 15/7652; G06Q 30/06; G06Q 30/0601; H04L 67/104
See application file for complete search history.

(56) References Cited

U.S. PATENT DOCUMENTS

| 6,372,974 | B1 | 4/2002 | Gross et al. |
| 6,987,844 | B2 | 1/2006 | Himmel et al. |
| 7,296,077 | B2 | 11/2007 | Harmon et al. |
| 7,440,994 | B2 | 10/2008 | Harrow et al. |
| 7,522,675 | B2 | 4/2009 | Sheynman et al. |
| 8,224,752 | B2 | 7/2012 | Read et al. |
| 2002/0058504 | A1 | 5/2002 | Stanforth |
| 2002/0065045 | A1 | 5/2002 | Kim |

(Continued)

OTHER PUBLICATIONS

Matei Ripeanu "Peer-to-Peer Architecture Case Study: Gnutella Network" Computer Science Department, The University of Chicago (c) 2002 IEEE (Year: 2002).*

(Continued)

*Primary Examiner* — Naeem U Haq
(74) *Attorney, Agent, or Firm* — Haynes and Boone, LLP (57) ABSTRACT

Method for transferring an entitlement from a first party to a second party in a communication network. The second party which is preferably a mobile communication connects to a mobile communication network and to a peer-to-peer network. The second party selects, over the peer-to-peer network, entitlement offered by the first party to purchase or to use a product or a service. The second party effects the entitlement, using the mobile communication terminal, to purchase or to use the product or the service.

20 Claims, 9 Drawing Sheets

(56) References Cited

U.S. PATENT DOCUMENTS

2006/0106878 A1 5/2006 Walker et al.
2007/0250912 A1 10/2007 Rassool et al.

OTHER PUBLICATIONS

Jem E. Berkes "Decentralized Peer-to-Peer Network Architecture: Gnutella and Freenet" University of Manitoba, Apr. 9, 2003 (Year : 2003).*
Damien A. Riehl "Peer-to-peer Distribution Systems: Will Napster, Gnutella, and Freenet Create a copyright Nirvana or Gehenna?" William Mitchell Law Review, vol. 27, Issue 3, 2001 (Year: 2001).*

* cited by examiner

SYSTEM AND METHOD FOR COMMUNICATION BETWEEN MOBILE DEVICES

CROSS-REFERENCE TO RELATED APPLICATIONS

The present application is a continuation of U.S. patent application Ser. No. 12/517,559 filed on Jun. 4, 2009 and entitled "Transferring Entitlements in Communication Networks," which is a U.S. National Phase application under 35 U.S.C. 371 of PCT International Application No. PCT/IL2007/001501, which has an international filing date of Dec. 5, 2007, which claims priority from U.S. Provisional Patent Application Ser. No. 60,868,637, filed Dec. 5, 2006, entitled "Transferring Entitlements in Communication Networks", priority of which is hereby claimed, and the disclosures of which are hereby incorporated by reference.

FIELD AND BACKGROUND OF THE INVENTION

The present invention relates to communication networks and, more particularly, but not exclusively to a combination of mobile networks and peer-to-peer networks.

The competition between operators of communication networks drives the operators to offer more than simple connectivity between parties. To differentiate themselves, to create competitive advantage, and to increase their revenues, operators sell various services and products in a variety of plans and bundles. For example, in a mobile network a subscriber can therefore buy airtime in bulk, for a lower fee per minute if indeed the subscriber uses exactly the number of airtime minutes bought. A subscriber can also buy a combination of airtime voice minutes, short message service (SMS) messages and Internet access capacity (typically in Bytes). In other situations, the operator grants the subscriber the right to purchase a service or a product at a reduced price. For example, if the subscriber reached a predefined consumption of airtime minutes the subscriber is entitled to purchase a ringtone at a reduced price. However, much of the offerings available to the subscriber are left unused. For example, typically, only about two thirds of airtime purchased in bulk are actually used. If a subscriber does consume most of the airtime minutes, much of the SMS messages or Internet access are not used, or vice versa. In spite of the operators efforts to offer plans that fits the needs of some types of "average subscribers", no subscriber really fits any average. Similarly, the operators do their best to offer (coupons for) extra services and products that a subscriber would purchase, or use, but the buying rate is still low. It is also a common practice to target selling campaigns on customers with buying attitudes. It is therefore in the interest of a subscriber to execute the entitlements for services or products. The simplest example is that a company buying airtime in bulk for its employees would pay less per airtime minute than each of its employees would when buying independently.

There is thus a widely recognized need for, and it would be highly advantageous to have, a system for sharing entitlements for services and products in a communication network, which is devoid of the above limitations.

SUMMARY OF THE INVENTION

According to one aspect of the present invention there is provided a method for transferring an entitlement from a first party to a second party, the second party being a mobile communication terminal, the method including:
  connecting the mobile communication terminal to a mobile communication network;
  connecting the mobile communication terminal to a peer-to-peer network;
  selecting an entitlement for at least one of a product and a service, the entitlement offered by the first party, and selected by the second party, over the peer-to-peer network; and
  effecting the entitlement using the mobile communication terminal and at least one of the mobile communication network and the peer-to-peer network.

According to another aspect of the present invention there is provided a method for transferring entitlement wherein the entitlement is effected by communicating with at least one of a network server and a network terminal.

According to yet another aspect of the present invention there is provided a method for transferring entitlement wherein the entitlement enables the second party to communicate with a third party using terms entitled to the first party.

According to still another aspect of the present invention there is provided a method for transferring entitlement wherein the second party communicates with the third party via a network terminal associated with the first party.

Further according to another aspect of the present invention there is provided a method for transferring entitlement wherein the second party communicates with the third party via a network gateway using access terms entitled to the first party.

Still further according to another aspect of the present invention there is provided a method for transferring entitlement wherein the entitlement enables the second party to acquire an entity.

Even further according to another aspect of the present invention there is provided a method for transferring entitlement wherein the entity is acquired by the second party by communicating the entity to the mobile communication terminal over at least one of the mobile communication network and the peer-to-peer network.

Still further according to yet another aspect of the present invention there is provided a method for transferring entitlement wherein the entity is communicated to the mobile communication terminal from a network terminal associated with the first party.

Additionally according to another aspect of the present invention there is provided a method for transferring entitlement wherein the entity is communicated to the mobile communication terminal from a network sewer via a network terminal associated with the first party.

Additionally according to still another aspect of the present invention there is provided a method for transferring entitlement wherein the entity is communicated to the mobile communication terminal from a network server using access terms entitled to the first party.

Also according to even another aspect of the present invention there is provided a method for transferring entitlement wherein the first party is at least one of:
  a subscriber of a mobile communication network; and
  a provider of a mobile communication service.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The principles and operation of a system and a method for transferring entitlements in communication networks according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

Figure 1:
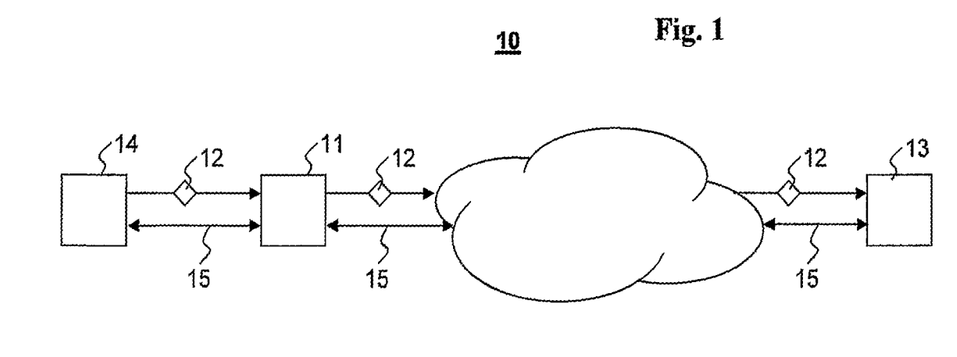
FIG. 1 is a simplified illustration of an entitlements transferring network.

Reference is no made to FIG. 1, which is a simplified illustration of an entitlements transferring network 10.

The entitlements transferring network 10 shown in FIG. 1 enables a first user 11 to receive or to acquire an entitlement 12 for a product or a service, and then to transfer the entitlement, or a part of the entitlement, to a second user 13. Typically, the entitlement, the product and/or the service are provided by a granting entity 14. The second user 13 can then effect the entitlement (shown as bi-directional arrows 15), or a part of the entitlement, such as to obtain the product or to use the service associated with the entitlement. Typically the product or the service are obtained from the granting entity 14. However, it is possible that the granting entity 14 entitles the first user 11 to obtain a product or a service from a fourth party (not shown).

For example, the granting entity 14 is a mobile telephone service operator. The operator may grant a subscriber (user) of the mobile telephone service an entitlement for a service or a product. An entitlement for a service can be granted as free of charge or reduced price for air-time minutes of voice communication, SMS (short-message-service) messages for text communication, throughput or bandwidth for video transmissions, etc. Entitlements for products may enable the user to obtain or download ringtones, ringback music, icons, video clips, screen savers, etc.

The entitlements transferring network 10 typically operates over a peer-to-peer network operative, entirely or partially, over a mobile communication network such as a cellular network, a WiMAX network, etc. Typically, the first user uses a mobile terminal, which is both a terminal of the mobile network and a terminal of the peer-to-peer network, to receive or to acquire the entitlement. Typically, the first user uses the mobile terminal to offer the entitlement to other users of the mobile network and the peer-to-peer network. Typically, the second user uses a mobile terminal, which is both a terminal of the mobile network and a terminal of the peer-to-peer network, to select, obtain and effect the offered entitlement.

Preferably, the first user (the offering party), and/or a network terminal of the first user, are involved the process of effecting the entitlement. Preferably, the entitlements transferring network 10 enables the second user to make use of the mobile terminal of the first user while effecting the entitlement. Making use of the mobile terminal of the first user typically involves remotely controlling the mobile terminal, preferably without active involvement of the first user. However, the first user may prefer, and condition effecting the entitlement on, being actively involved.

Preferably, when the first user (the offering party), and/or a network terminal of the first user, are involved the process of effecting the entitlement the first user can determine the conditions for effecting the entitlement. Particularly, the first user can specify the conditions in which the second user can make use of the mobile terminal of the first user while effecting the entitlement. For example, such conditions may be time-of-day or day-of-the-week for assuming remote control the mobile terminal of the first user.

Figure 2:
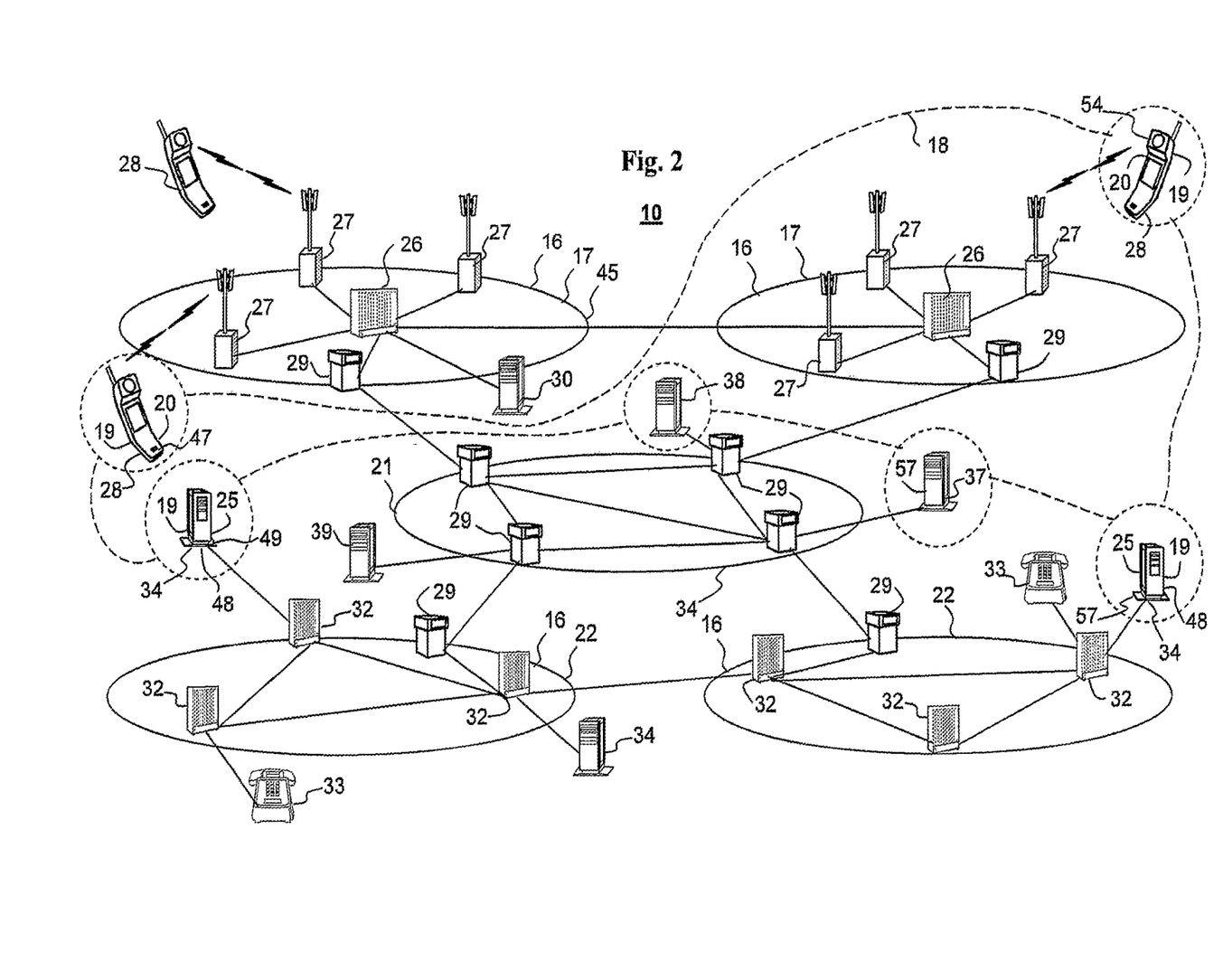
FIG. 2 is a more detailed simplified illustration of the entitlements transferring network.

Reference is no made to FIG. 2, which is a more detailed simplified illustration of the entitlements transferring network 10.

As shown in FIG. 2, the entitlements transferring network 10 preferably contains a plurality of communication networks 16. Preferably, at least one of the communication networks is a public land mobile network (PLMN) 17, such as a cellular telephony network.

Preferably, the entitlements transferring network 10 also contains at least one peer-to-peer network 18. The peer-to-peer network 18 is typically a logical network of terminals 19, which are terminals of one or more physical networks, such as networks 16. Some of the terminals of the physical networks, which are designated by the numeral 20, are peer terminals in the peer-to-peer network 18. Preferably, the peer-to-peer network 18 is implemented, at least partially, over the Internet 21.

It is appreciated that the entitlements transferring network 10 can additionally contain a public switched telephone network (PSTN) 22 and/or a packet switched data network (PSDN) (not shown in FIG. 2). Some of the peers of the peer-to-peer network 18 may therefore be terminals of the Internet 23, connected to the Internet 24 via a PSTN or a PSDN network, such as terminals designated by numeral 25.

Typically, the PLMN 17 contains at least one mobile switching center (MSC) 26 connected to base-stations 27, which connect to mobile terminals 28 using wireless access technology. Preferably, the PLMN 17 connects to the Internet 21, typically via routers 29 or similar devices. Preferably, the PLMN 17 also connects to a mobile applications server 30, typically to provide content and other value added services to the mobile terminals 28.

It is appreciated that the mobile terminals 28 can be dual mode or triple mode terminals, preferably able to communicate via the PLMN network 17 as well as via a wireless broadband network such as wireless PAN, WAN or MAN, such as Bluetooth, WiFi, WiMAX, etc. It is also appreciated that such multi-mode mobile terminals 28 can communicate via the peer-to-peer network 18 via the PLMN network 17 as well as via the wireless broadband network, preferably via the Internet 31. It is further appreciated that such multi-mode mobile terminals 28 can communicate via the PLMN network 17 and via the wireless broadband network simultaneously.

Typically, the PSTN 22 contains at least one central office switch (CO) 32 connected to telephone terminals 33 and/or to data terminals 34, using telephone and/or broadband access technology. Preferably, the PLMN 22 connects to the Internet 21, typically via routers 35 or similar devices. Preferably, the PSTN 22 also connects to a telecom applications server 36, typically to provide content and other value added services to the mobile terminals 28 and/or the data terminals 34, such as desktop computers, laptop computers, etc.

The peer-to-peer network 18 preferably contains a peer-to-peer network server 37, to help the peer terminals 20 locate each other.

Preferably, the entitlements transferring network 10 contains an entitlement exchange server 38. The entitlement exchange server 38 is preferably a peer terminal of the peer-to-peer network 18 and connects to the Internet 21. It is appreciated that the entitlement exchange server 38 can connect to the Internet 21 directly (as shown in FIG. 2) or via any of the networks 16.

It is appreciated that the entitlements transferring network 10 may additionally and preferably contain an Internet applications server 39, providing communication services and/or information services to terminals having access to the Internet 21.

Figure 3:
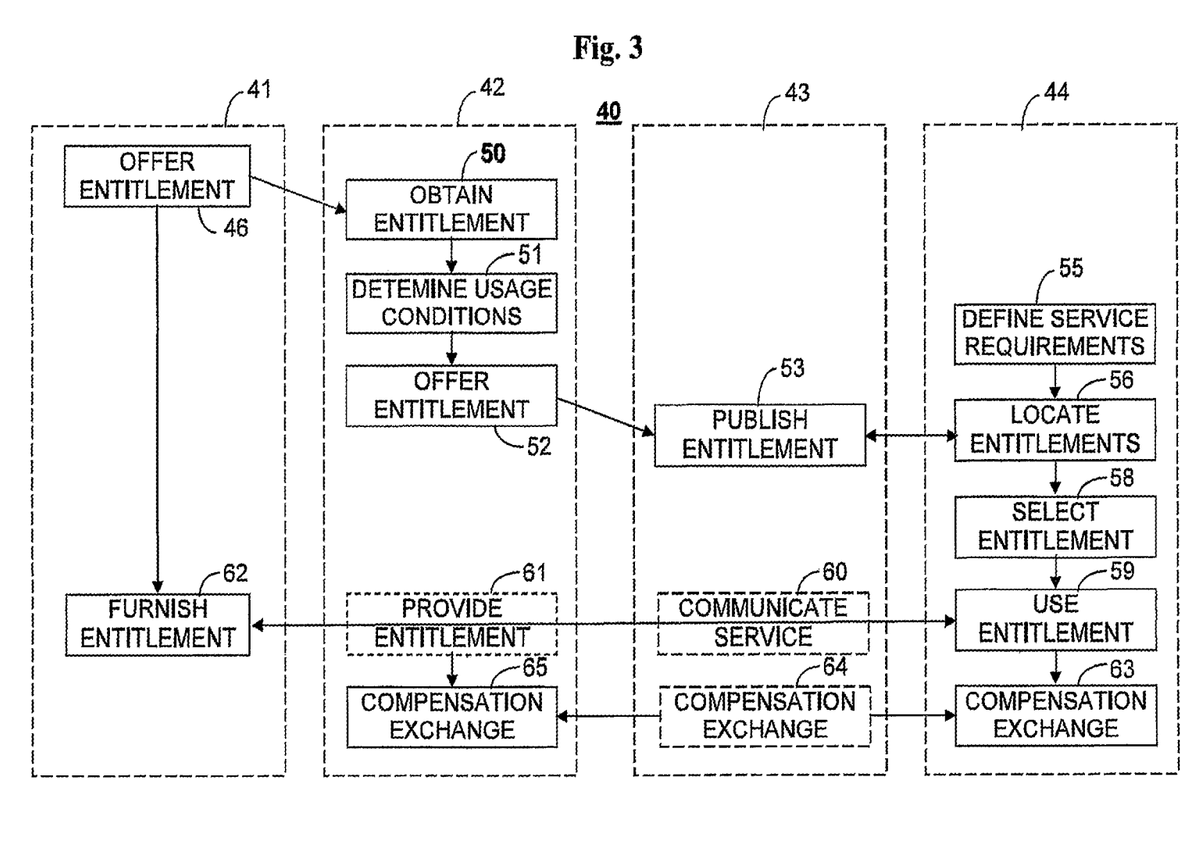
FIG. 3 is a simplified flow diagram of an entitlement transferring process.

Reference is now made to FIG. 3, which is a simplified flow diagram of an entitlement transferring process 40.

As shown in FIG. 3, the entitlement transferring process 40 preferably contains four sub-processes, preferably executed by four different entities:

a service operator sub-process 41, preferably executed by a network server operated by a service operator;

an entitlement-offering sub-process 42, preferably executed by an entitlement-offering subscriber, preferably using a terminal device, such as terminal device 19;

an entitlement-publishing sub-process 43, preferably executed by the entitlement exchange server 38;

an entitlement-using sub-process 44, preferably executed by an entitlement-using subscriber, preferably using a terminal device, such as terminal device 19;

It is appreciated that the network server executing the service operator sub-process 41 is typically operated by, a service operator that operates a communication service such as service operator operating the PLMN 17 designated in FIG. 2 by numeral 45. In such case, the network server is typically a billing system or a similar computing system involved in accounting for the use of airtime. Alternatively, the network server can be operated by a content providing service, such as a service operating the mobile applications server 30.

Typically, the entitlement transferring process 40 starts with the service operator offering an entitlement to use a service or to a product. Preferably, the service operator operates the service operator sub-process 41. Typically the offer is made (step 46) to a first subscriber of a communication network. For example, to a subscriber using a terminal designated in FIG. 2 by numeral 47.

The entitlement transferring process 40 preferably proceeds to the entitlement-offering sub-process 42.

The entitlement-offering sub-process 42 is preferably performed using a terminal device such as the mobile terminal designated by numeral 47, preferably using a terminal entitlement-offering software program executed by the terminal device. Alternatively, the entitlement-offering sub-process 42 is performed using a personal entitlement exchange server 48, such as the data terminal 34 designated by numeral 49, preferably by using a personal server entitlement-offering software program. Preferably, the personal entitlement exchange server 49 and the mobile terminal 47 are both owned and operated by the first subscriber. Alternatively, the function of the personal entitlement exchange server 48 can be hosted on a hosting server, operating on behalf of the mobile terminal. Preferably, the hosting server is owned and operated by entitlements exchange service provider.

Performing the entitlement-offering sub-process, the first subscriber obtains the entitlement offered by the service provider (step 50) and decides to share the entitlement with other subscribers, or to transfer the entitlement to other subscribers. The first subscriber then determines the terms and conditions in which other subscribers can use the entitlement (step 51), and offer the entitlement (or a part of the entitlement) for public use (step 52).

The entitlement transferring process 40 preferably implementing the entitlement-publishing sub-process 43. The entitlement transferring process 40 is preferably performed using entitlement-publishing software program executed by the entitlement exchange server 38. Alternatively, the entitlement-publishing sub-process 43 is executed using a personal-server publishing software program executed by the personal entitlement exchange server 49. Alternatively, the publishing can be performed via a terminal device such as the mobile terminal 47, preferably using a terminal publishing software program executed by the terminal device.

The entitlement-publishing sub-process 43 performs publishing (step 53) of the offer made by the first subscriber. In step 53 the first subscriber (the entitlement-publishing, or the entitlement-offering, subscriber) publish the offer to use the entitlement provided by the service operator.

The entitlement transferring process 40 preferably proceeds with the entitlement-using sub-process 44 when a second subscriber decides to search, select and use an entitlement on offer. The second subscriber executes the entitlement transferring process 40 preferably by using an entitlement-selection software program executed by his or hers mobile terminal 28, such as mobile terminal 28 designated in FIG. 2 by numeral 54. Alternatively, the second subscriber (the entitlement-using subscriber) uses a data terminal device, such as the data terminal device 34, such as a desktop computer or a laptop computer, preferably by using preferably using an data-terminal entitlement-selection software program.

The entitlement transferring process 40, the second user preferably starts by defining the service or products of interest (step 55).

Preferably, the entitlement transferring process 40 proceeds to search for entitlements on offer that match the requirements made by the second subscriber (step 56). Preferably, the search is performed by a software program executed by the mobile terminal 28 designated by numeral 54.

Alternatively and preferably, the software program executed by the mobile terminal 28 designated by numeral 54 sends a search request to a software program executed by a personal computer, such as the data terminal 34 designated in FIG. 2 by numeral 57, which is preferably the personal entitlement exchange server 48 associated with the mobile terminal 54, both preferably owned and operated by the second subscriber. The personal entitlement exchange server 48 designated in FIG. 2 by numeral 57 performs the search on behalf of the mobile terminal 54. The information regarding the entitlements that match the requirements defined by the second user are sent to the software program executed by the mobile terminal 54 and presented to the second subscriber (step 56).

It is appreciated that the search for entitlements is preferably performed over the peer-to-peer network 18, by either the mobile terminal 54, or preferably, by the personal entitlement exchange server 57, interrogating the entitlement exchange server 38, or, preferably, by interrogating personal entitlement exchange servers 48, such as the personal entitlement exchange server 49.

The entitlement transferring process 40 preferably proceeds when the second subscriber selects a preferred entitlement (step 58).

The entitlement is then used, preferably by the mobile terminal designated by numeral 54 (step 59), preferably at least partially via the peer-to-peer network 18, optionally via the entitlement exchange server 38, and/or, via the personal entitlement exchange server 49, and/or, via the personal entitlement exchange server 57 (step 60), and/or via the mobile terminal 47 (step 61), typically involving the service operator sub-process 41 (step 62).

The entitlement transferring process 40 preferably ends with the transfer of some compensation from the second user to the first user. Preferably, the transfer of the compensation is executed over the peer-to-peer network 18. Typically, the transfer of the compensation involves the mobile terminal 28 designated by numeral 54, or the personal entitlement exchange server designated by numeral 49 (step 63), optionally also the entitlement exchange server 38 (step 64), and the mobile terminal 28 designated by numeral 54, or the personal entitlement exchange server designated by numeral 49 (step 65). It is appreciated that the transfer of compensation is optional.

It is appreciated that the publishing of, and the search for, entitlements can be performed in various manners, including, but not limited to, the following possibilities and their combinations:

Entitlements are posted in one or more central entitlement exchange servers 38, the search is performed in the central entitlement exchange servers 38. Preferably, if there are several entitlement exchange servers 38, the search is executed as a distributed search, preferably concurrently in all relevant entitlement exchange sewers 38.

Entitlements are posted in one or more terminals, preferably peers of the peer-to-peer network 18, such as mobile terminals 28 or data terminals 34, preferably personal entitlement exchange servers 49. The searching terminal accesses a central server to receive the network addresses of the terminals on which entitlements are posted. The central server is preferably a server in the peer-to-peer network 18, preferably the entitlement exchange servers 38. After receiving the network addresses of the terminals on which entitlements are posted the searching terminal performs the search. Preferably, the search is executed as a distributed search, preferably concurrently in all relevant terminals and personal entitlement exchange servers 49.

Figure 4A:
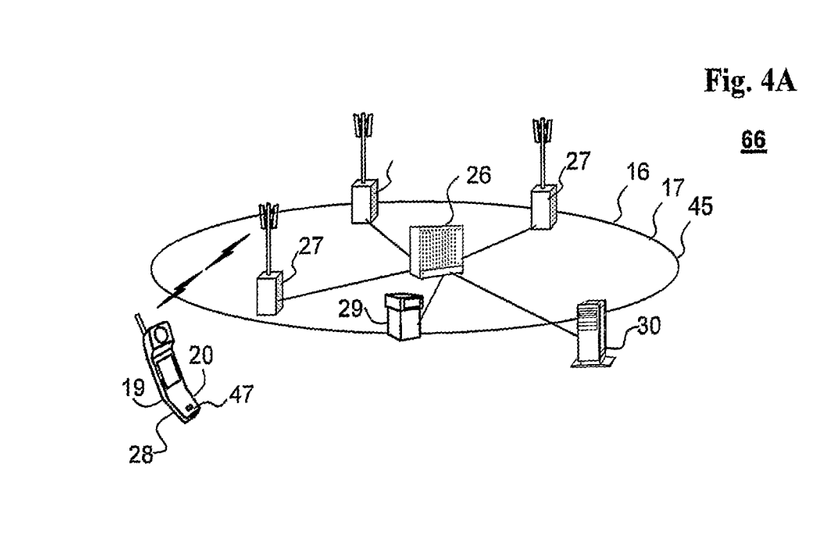
FIGS. 4A, 4B and 4C are simplified illustrations of three phases in a termination airtime sharing process performed in the entitlements transferring network.
Figure 4B:
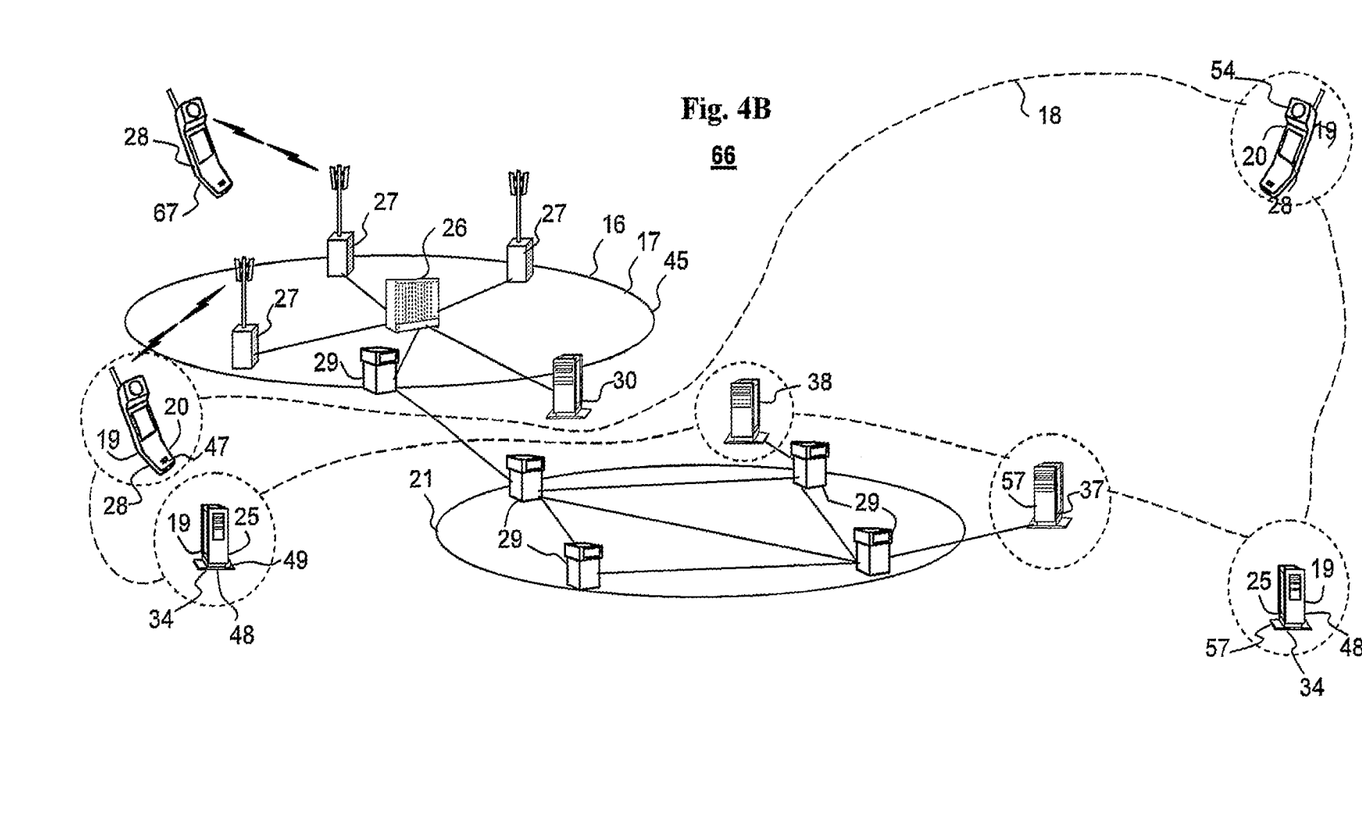
Figure 4C:
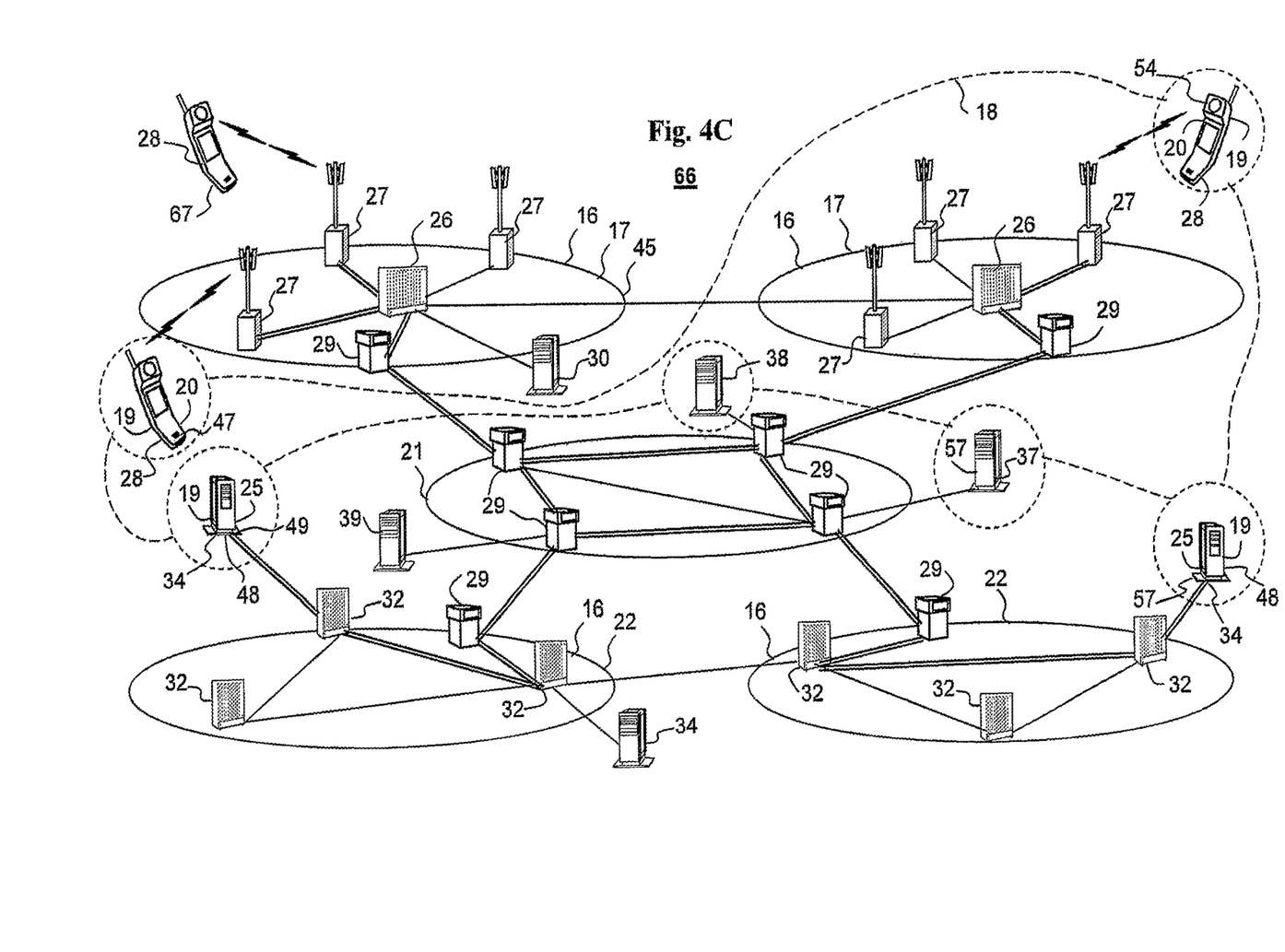

Reference is now made to FIGS. 4A, 4B and 4C, which provide simplified illustrations of three phases performed in a termination airtime sharing process 66, in the entitlements transferring network 10.

The termination airtime sharing process 66 describes sharing, or reselling, airtime in a mobile communication network. However, it is appreciated that the termination airtime sharing process 66 also refers to the sharing, or the reselling, of any communication or access providing service, whether mobile, wireless or fixed, whether point-to-point communication, broadcast or multicast, etc.

As shown in FIG. 4A, the termination airtime sharing process 66 preferably starts with a service operator, preferably operating the mobile network 45, offering a service plan, corresponding to step 46 of FIG. 3. For example, the service plan provides communication between subscribers of the mobile network 45. For example, the service operator offers to sell airtime in bulk for a reduced price. A first user, preferably owning the mobile terminal 47, then buys the service plan (corresponding to step 50 of FIG. 3).

The first user then preferably offers to other users to share the purchased bulk airtime. Preferably, the first user uses a software program, preferably implementing the entitlement-offering sub-process 42, preferably processed by a mobile terminal 28 such as the mobile terminal 47, or, alternatively, by a data terminal 34, such as the personal entitlement exchange server 48, such as the personal entitlement exchange server 49.

The first user then preferably determines usage conditions for the offered entitlement, preferably by performing step 51 of FIG. 3. The first user preferably sets one or more conditions for sharing the airtime such as:
- limit the use of airtime to specific time-of-day, or day-of-the-week, etc.,
- enable sharing only when the first user is not using the service, etc.
- enable sharing only when the mobile terminal 47 is charging, etc.
- enable sharing only when mobile terminal 47 is within wireless broadband network coverage (such as wireless PAN, WAN or MAN, such as Bluetooth, WiFi, WiMAX, etc.)
- require compensation for sharing the airtime, such as monetary compensation, credit points, specific barter deal, etc.

Preferably, the first user resells the airtime at a price, which is higher than the price of the bulk purchased airtime but lower than the price of airtime for a guest user. Typically, a guest user is not a subscriber of the mobile network 45. Alternatively, the guest user is a subscriber of the mobile network 45 that would not buy the offered service plan for whatever reason.

The first user then preferably offers the entitlement, preferably by performing step 52 of FIG. 3. Preferably, as shown in FIG. 4B, the airtime sharing offering is published over a peer-to-peer network 18, preferably implemented over the Internet 21, or a similar network.

It is appreciated that the publishing of the airtime sharing offer, as well as other entitlement sharing offer, can be done in any of the following methods, preferably using an entitlement publishing software program, preferably implementing the entitlement-publishing sub-process 43, executed by the following respective computing entities:
- publishing the offer directly on the mobile terminal 47, being a peer device of the peer-to-peer network 18, executed by the mobile terminal 47;
- publishing the offer on a data terminal, which is a peer device of the peer-to-peer network 18, such as the personal entitlement exchange server 48, preferably the personal entitlement exchange server 49 associated with the mobile terminal 47, thus eliminating the need from the mobile terminal 47 for constant presence over the peer-to-peer network 18;
- publishing the offer on a general purpose publishing server such as the entitlement exchange server 38, thus eliminating the need for the personal entitlement exchange server 49.

Turning to FIG. 4C, the termination airtime sharing process 66 preferably continues with a second user, preferably the owner of the mobile terminal 54, that wants to communicate with a third subscriber, preferably the owner of the mobile terminal 67. The second user prefers to access the third subscriber via airtime sharing rather than, for example, to pay a guest access price. The second user preferably uses an entitlement search and use software program, preferably implementing the entitlement-using sub-process 44. The entitlement search and use software program preferably executed by a mobile terminal 28 such as the mobile terminal 54, or, alternatively, by a data terminal 34, such as the personal entitlement exchange server 48, such as the personal entitlement exchange server 57 (FIG. 4B).

The second user then defines the required service, searches for an airtime sharing offer and select one of the published offers, preferably over the peer-to-peer network 18, preferably corresponding to steps 49 to 58 of FIG. 3.

It is appreciated that the search for the airtime sharing offer, as well as other entitlement sharing offers, can be done in any of the following methods:
- searching for the required offer directly on the mobile terminal 54, being a peer device of the peer-to-peer network 18;
- searching for the offer by using a data terminal, which is a peer device of the peer-to-peer network 18, preferably associated with the mobile terminal 54, such as the personal entitlement exchange server 57;
- searching for the offer by using a mobile terminal, such as the mobile terminal 54 to instruct a data terminal that is a peer device of the peer-to-peer network 18, preferably associated with the mobile terminal 54, such as the personal entitlement exchange server 57 to perform the search;
- searching for the offer by using a mobile terminal, such as the mobile terminal 54 to instruct a search server that is a peer device of the peer-to-peer network 18, such as the entitlement exchange server 38 to perform the search;
- searching for the offer within a central database, which is hosted on a central server, such as the entitlement exchange server 38;
- searching for the offer by interrogating a plurality of peer devices, such as the mobile terminal 47 or the personal entitlement exchange server 49.

Turning to FIG. 4C, the second user then executes the selected entitlement, preferably corresponding to steps 59 to 62 of FIG. 3 by using the mobile terminal 54 to communicate with the mobile device 67, preferably in the following way:
- The mobile terminal 54 communicates via an Internet Protocol (IP) communication service with the mobile terminal 47, either directly, or via the personal entitlement exchange server 57, or via the personal entitlement exchange server 49, or via both entitlement exchange servers.
- The mobile terminal 47 dial to the mobile terminal 67 via the mobile communication network 45, and then connects the call from the mobile terminal 54 (via the IP network 21 with the call via the mobile communication network 45.

The termination airtime sharing process 66 preferably completes by communicating compensation for the sharing of airtime, preferably corresponding to steps 63 to 65 of FIG. 3. The compensation can be communicated in one of the following manners:
- from the mobile terminal device 54 to the mobile terminal device 47;
- from the mobile terminal device 54 to the personal entitlement exchange server 49;
- from the personal entitlement exchange server 57 to the mobile terminal device 47;
- from the personal entitlement exchange server 57 to the personal entitlement exchange server 49;
- from the personal entitlement exchange server 57 to the entitlement exchange server 38.

It is appreciated that either or both the mobile terminals 48 and 54 preferably connect to the peer-to-peer network 18 via broadband connectivity, either via the PLMN 17 or via wireless PAN, WAN or MAN, such as Bluetooth, WiFi, WiMAX, etc. It is appreciated that the session preferably connects the mobile terminal 54 via the broadband connectivity (not shown) to the peer-to-peer network 18, over the Internet 21 via broadband connectivity, to the mobile terminal 48 and via the PLMN 17 to the mobile terminal 67.

Figure 5:
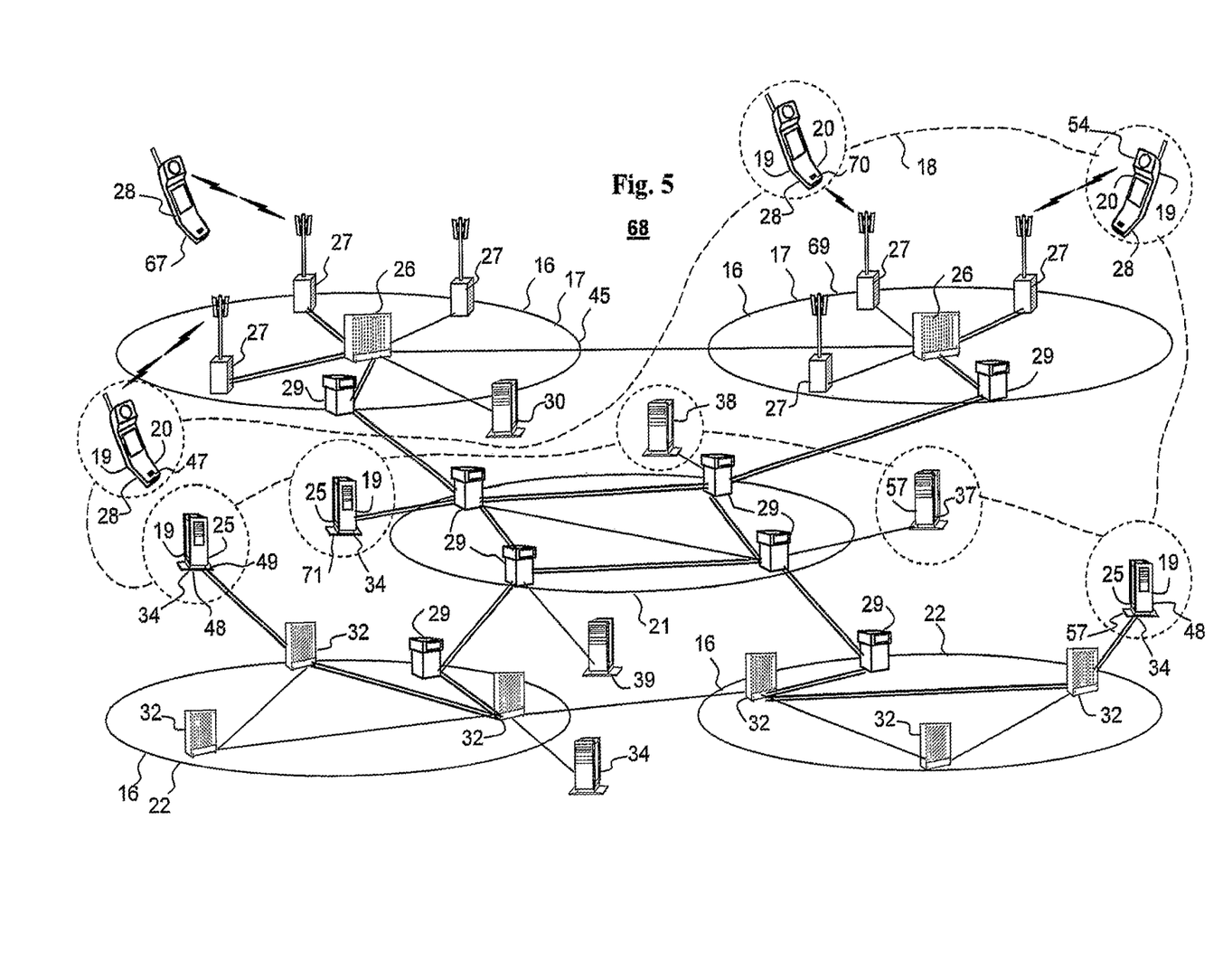
FIG. 5 is a simplified illustration an access airtime sharing process performed by the entitlements transferring network.

Reference is now made to FIG. 5, which is a simplified illustration an access airtime sharing process 68, within the entitlements transferring network 10.

The flow of the termination airtime sharing process 66 described above in accordance with FIGS. 4A to 4C provides an example of sharing entitlement for call completion. In the termination airtime sharing process 66, the subscriber associated with mobile terminal 47 provides the subscriber associated with mobile terminal 54 call termination service (or call completion service). Particularly, the call to the mobile terminal 67 is completed using the subscription account associated with the mobile terminal 47. In the access airtime sharing process 68 the subscriber associated with mobile terminal 54 preferably requires access to the local network 69.

Roaming is a typical situation where a subscriber using a mobile terminal accesses a mobile communication network that is not the mobile communication network to which the subscriber subscribes. Usually there are roaming agreements between mobile communication services to provide for such situations, however, the price for placing such a call is usually relatively high. A roaming subscriber may therefore seek an offer for access airtime sharing. Preferably, the access airtime sharing is provided as a call-back. In the call-back service the requesting party appeals to the offering party to provide access to a local communication network by calling the requesting party.

The entitlements transferring network 10, and the corresponding method, devices and software program described in accordance with FIG. 5 are similar to the entitlements transferring network 10, and the corresponding method, devices and software program described in accordance with FIGS. 3, 4A, 4B and 4C except for the following differences:

In FIG. 5 the subscriber using the mobile terminal 54 (the second subscriber) calls the mobile terminal 67 (third subscriber) using both the access airtime sharing process 68 and the termination airtime sharing process 66. The access airtime sharing process 68 is preferably offered by a subscriber to the mobile network 69 (fourth subscriber), preferably operating a mobile terminal designated by numeral 70, and optionally and preferably additionally operating the personal entitlement exchange server 48 designated by numeral 71. Typically, the user of the mobile terminal 54 is not a subscriber to the mobile network 69.

Preferably, the user of the mobile terminal 70, herein the fourth subscriber, obtains an entitlement from the service operator operating the mobile network 69 (steps 46 and 50 of FIG. 3). Preferably, the entitlement involves placing calls within the mobile network 69. The fourth subscriber determines the conditions for using the entitlement, offers the entitlement, and publishes the entitlement, in a manner similar to steps 51 to 53 of FIG. 3. The second subscriber preferably searches and selects the access entitlement preferably performing steps 55 to 58 of FIG. 3. To use the entitlement (corresponding to steps 59 to 62 of FIG. 3), one of the following options is performed:

The mobile terminal 70 dials to the mobile terminal 54, and when the second subscriber answers the call the mobile terminal 70 provides a dial tone, receives a destination number from the mobile terminal 54, and places a conference call to the destination number.

The mobile terminal 70 contacts the mobile terminal 54 via Internet Protocol (IP), preferably via the Internet, receives the destination number from the mobile terminal 54, and places a conference call to the destination number.

The mobile terminal 70 contacts the mobile terminal 54 via Internet Protocol (IP), preferably via the Internet, receives from the mobile terminal 54 the identification of the destination terminal, and contacts the destination terminal (i.e. mobile terminal 67) via Internet Protocol (IP), preferably via the Internet.

The personal entitlement exchange server 71 contacts the mobile terminal 54 via Internet Protocol (IP), preferably via the Internet, receives from the mobile terminal 54 the identification of the destination terminal, and contacts the destination terminal (i.e. mobile terminal 67) via Internet Protocol (IP), preferably via the Internet.

In the example described in FIG. 5 the second subscriber additionally uses the termination airtime sharing process 66 offered by the first subscriber. In this case the second subscriber selects the entitlement offered by the fourth subscriber and, preferably after obtaining access to the Internet, additionally selects the entitlement offered by the first subscriber, and proceeds in as described with accordance to FIGS. 4B and 4C.

Figure 6:
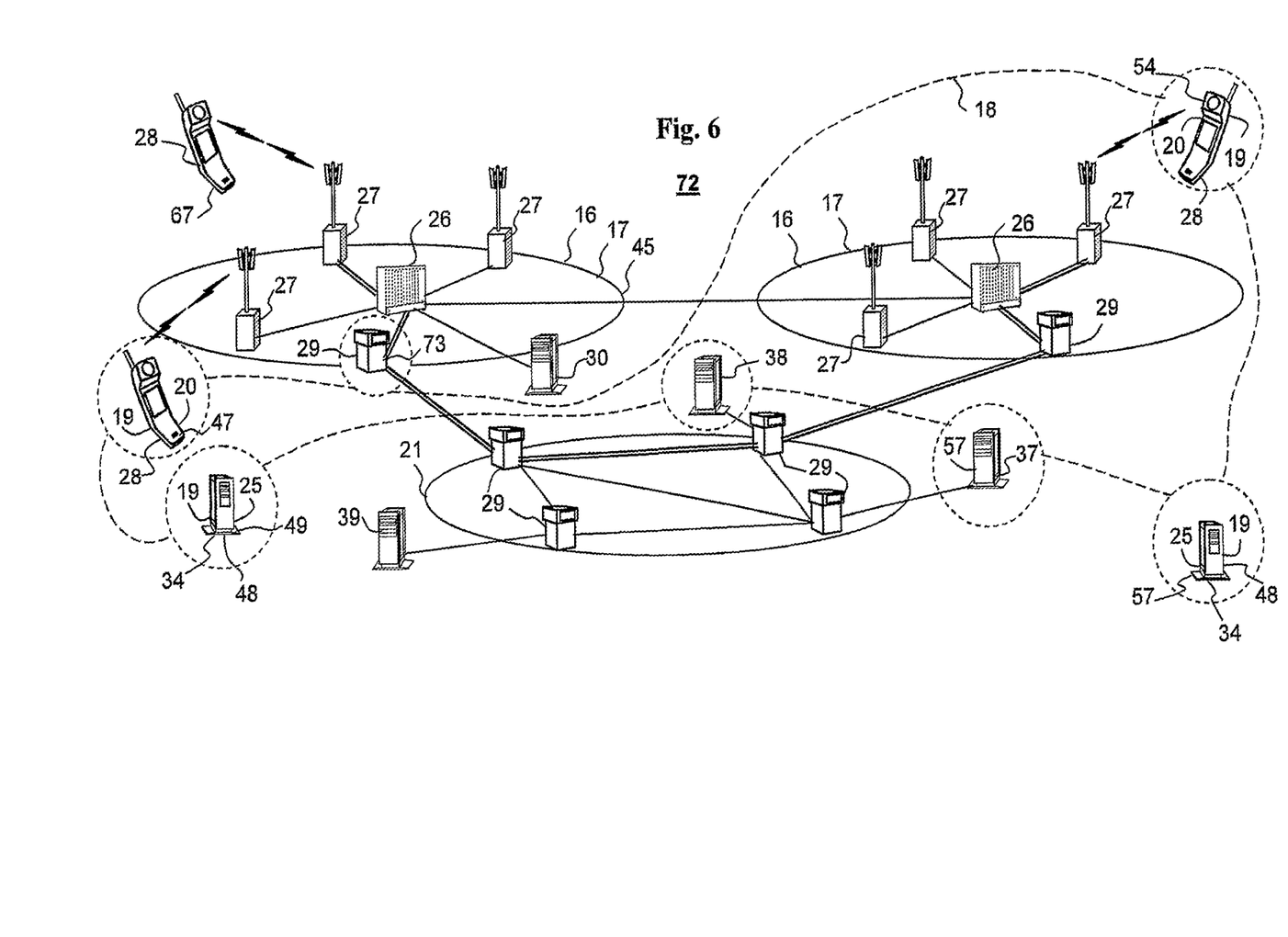
FIG. 6 is a simplified illustration of an entitlements transferring network using a gateway.

Reference is now made to FIG. 6, which is a simplified illustration of an entitlements transferring network 72 using a gateway 73.

The gateway 73 preferably interfaces between an IP network such as the Internet 21 and a telephone network such as the mobile communication network 45. The gateway 73 preferably uses an H.323 protocol or a session initiation protocol (SIP) or a similar session oriented protocol. The gateway 73 is preferably operated by a service provider, particularly, a gateway service provider. In the entitlements transferring network 72 of FIG. 6 the service operator operating the gateway 73 offers and furnishes entitlements, corresponding to steps 46 and 62 of FIG. 3. The entitlement can be obtained, offered and provided (steps 50 to 52, 61 and 61 of FIG. 3) by a subscriber of the gateway service, or by the gateway service provider itself. For example, the user of mobile terminal 54 searches, selects and uses provided (steps 55, 56, 58, 59 and 63 of FIG. 3) the entitlement via the Internet 21 and the gateway 73, to communicate with the mobile terminal 67. Preferably, the mobile terminal 47 is not involved in the execution of the entitlement (steps 59 to 62 of FIG. 3).

The entitlement transferring networks, systems and methods described above referred to a first party obtaining and transferring to a second party entitlement to use communication service provided by a third party. It is appreciated that the communication service can be provided by the first party.

Figure 7:
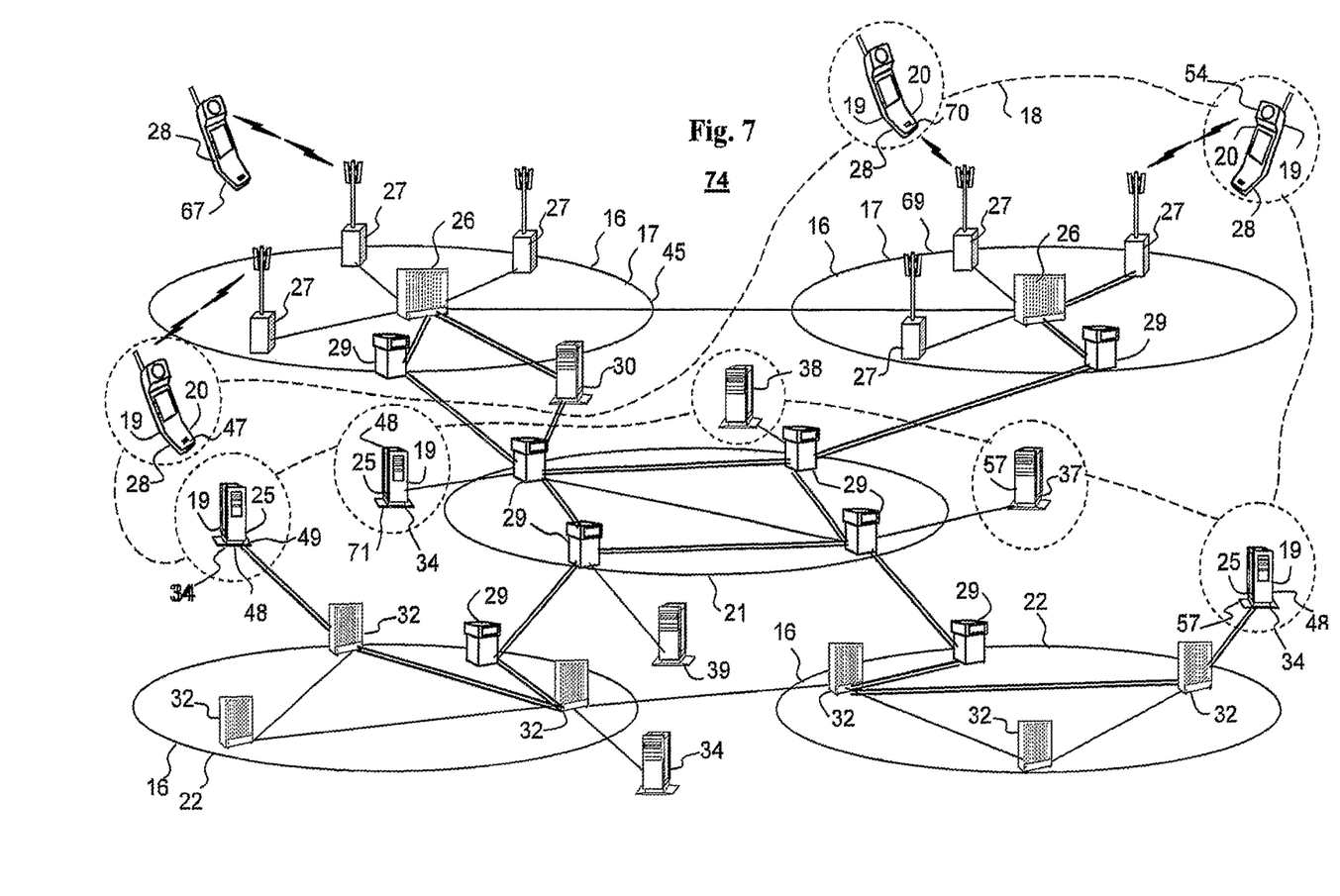
FIG. 7 is a simplified illustration of a content entitlement transferring network.

Reference is now made to FIG. 7, which is a simplified illustration of a content entitlement transferring network 74.

The entitlements transferring network 10 users to share entitlements (to offer entitlement and to use and an offered entitlement) for communication services, specifically to bilateral communication services, particularly, for mobile communication services. The entitlement transferring network 74 enables users to share entitlements for anything which is not strict communication service, and particularly content, more specifically, content that is available over a communication network. In the entitlement transferring network 74 of FIG. 7 the content is preferably available for download from a network server, for example the mobile applications server 30.

Preferably, a content service provider offers and furnishes entitlements for content stored in the mobile applications server 30 (steps 46 and 62 of FIG. 3). The entitlements are preferably obtained, offered and provided (steps 50 to 52, 61 and 61 of FIG. 3) by a user, preferably a subscriber of a communication service such as the subscriber owning the mobile terminal 47. Preferably, the user of mobile terminal 54 searches, selects and uses provided (steps 55, 56, 58, 59 and 63 of FIG. 3) the entitlement via the Internet 21. The entitlement can be executed in one of the following options:

The mobile terminal 54 communicates with the mobile terminal 47 (directly, or via the personal entitlement exchange server 49), which downloads the required content and communicates the content to the mobile terminal 54.

The mobile terminal 54 communicates with the mobile terminal 47 (directly, or via the personal entitlement exchange server 49), which already downloaded the required content and now communicates the content to the mobile terminal 54.

The mobile terminal 54 communicates with the personal entitlement exchange server 49, into which the content is already downloaded, and now communicates the content to the mobile terminal 54.

The mobile terminal 54 communicates with the mobile terminal 47 or with the personal entitlement exchange server 49 to obtain a code for downloading the required content from the network server, for example the mobile applications server 30. Then the mobile terminal 54 downloads the content directly from the network server.

The entitlement transferring network, system and method described above, particularly in accordance with FIG. 7, referred to a first party obtaining and transferring to a second party entitlement for content provided by a third party. It is appreciated that the content can be provided by the first party.

It is expected that during the life of this patent many relevant mobile communication technologies, devices and systems will be developed and the scope of the terms herein, as well as products and services associated with mobile communication services and mobile terminals. Consequently, the terms herein, and particularly the terms "entitlement" and "compensation", are intended to include all such new technologies, devices, systems, services and applications a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for communicating from a first party to a second party, the first party using a first mobile communication terminal, and the second party a using a second mobile communication terminal, the method comprising:
    connecting the first mobile communication terminal to a mobile communication network;
    connecting the first mobile communication terminal to a peer-to-peer network;
    offering a communication service for sharing with another party by publishing the offer using an exchange or publishing server of the peer-to-peer network;
    attaching a condition to the offer, where the condition includes a limitation on use or sharing of the communication service; and
    sharing the communication service with the second party in response to the second mobile communication terminal selecting the communication service from the exchange server by the first mobile communication terminal connecting with a third mobile communication terminal over the mobile communication network and connecting with the second mobile communication terminal over the peer-to-peer network and in accordance with the limitation on use or sharing.

2. The method of claim 1, wherein the communication service includes at least one of:
    airtime minutes for voice communication; and
    network bandwidth.

3. The method of claim 1, wherein the condition includes at least one of:
    a limit on the use of voice airtime to specific times of day;
    enable sharing of the communication service only when the first user is not using the communication service; or
    enable sharing of the communication service only when the first mobile communication terminal is within wireless broadband network coverage.

4. The method of claim 3, wherein the communication service allows the second party to communicate with a third party, and further wherein the second party communicates with the third party via the first mobile communication terminal.

5. The method of claim 1, wherein the communication service allows the second party to communicate with a third party, and further wherein the second party communicates with the third party via a network gateway.

6. The method of claim 1, wherein the mobile communication network comprises a cellular network.

7. The method of claim 1, wherein the communication service is shared by the first party to the second party by communicating the communication service to the second mobile communication terminal over at least one of the mobile communication network and the peer-to-peer network.

8. The method of claim 1, wherein the communication service is shared by the first party from the first mobile communication terminal.

9. The method of claim 1, wherein sharing the communication service comprises communicating the communication service to the second mobile communication terminal from a network server via the first mobile communication terminal.

10. The method of claim 1, wherein the first mobile communication terminal comprises a cellular telephone device.

11. The method of claim 1, wherein the first party is at least one of:
- a subscriber of a mobile communication network; and
- a provider of the communication service.

12. The method of claim 1, wherein connecting the first mobile communication terminal to the mobile communication network comprises connecting the first mobile communication terminal to a broadband network connection.

13. The method of claim 1, wherein sharing the communication service with the second party includes:
- communicating between the first mobile communication terminal and the second communication terminal over the peer-to-peer network via the Internet.

14. A computer program product, stored on one or more non-transitory computer-readable media, comprising instructions operative to cause a programmable processor of a first mobile communication terminal to:
- connect the first mobile communication terminal to a mobile telephone network and a peer-to-peer network;
- publish an offer to share a communication service of the mobile telephone network with other users of the peer-to-peer network, where publishing the offer includes posting the offer using a network server of the peer-to-peer network or publishing the offer directly to a second mobile communication terminal also connected to the peer-to-peer network; and
- in response to a selection of the communication service by the second mobile communication terminal, sharing the communication service with a user of the second mobile communication terminal subject to a condition of use or a condition of sharing by the first mobile communication terminal connecting with a third mobile communication terminal over the mobile telephone network and connecting with the second mobile communication terminal over the peer-to-peer network.

15. The computer program product of claim 14, wherein sharing the communication service enables the user of the second mobile communication terminal to communicate with a third party over the mobile telephone network.

16. The computer program product of claim 14, wherein sharing the communication service enables the user of the second mobile communication terminal to communicate with a third party via the first mobile communication terminal.

17. The computer program product of claim 14, wherein sharing the communication service enables the user of the second mobile communication terminal to communicate with the third party via a network gateway connected to the peer-to-peer network.

18. The computer program product according to claim 14, wherein a user of the first mobile communication terminal is at least one of:
- a subscriber of the mobile telephone network; and
- a provider of the communication service.

19. A first mobile communication terminal device comprising:
- a memory containing machine readable medium comprising machine executable code having stored thereon instructions for performing a method of communicating with a second mobile communication terminal device;
- a processor coupled to the memory, the processor configured to execute the machine executable code to:
  - receive a communication service for use on a mobile communication network;
  - connect the first mobile communication terminal device to the mobile communication network and to a peer-to-peer network;
  - publish an offer to share the communication service with another mobile communication terminal device, wherein publishing the offer includes either publishing the offer on a network server of the peer-to-peer network or publishing the offer directly to the second mobile communication terminal device via the peer-to-peer network; and
  - sharing the communication service with a user of the second mobile communication terminal device in response to a selection of the communication service by the user of the second mobile communication terminal device, wherein sharing the communication service includes by the first mobile communication terminal device connecting with a third mobile communication terminal device over the mobile communication network and connecting with the second mobile communication terminal device over the peer-to-peer network, wherein the sharing is limited by conditions placed on the sharing by a user of the first mobile communication terminal device.

20. The first mobile communication terminal device of claim 19, comprising a cellular phone.

* * * * *